(12) United States Patent
Nada et al.

(10) Patent No.: US 9,821,662 B2
(45) Date of Patent: Nov. 21, 2017

(54) BRAKING FORCE CONTROL SYSTEM, VEHICLE AND METHOD OF CONTROLLING BRAKING FORCE

(71) Applicant: TOYOTA JIDOSHA KABUSHIKI KAISHA, Toyota-shi, Aichi-ken (JP)

(72) Inventors: Mitsuhiro Nada, Toyota (JP); Kenji Umayahara, Miyoshi (JP); Takuya Nakagami, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 84 days.

(21) Appl. No.: 14/938,451

(22) Filed: Nov. 11, 2015

(65) Prior Publication Data

US 2016/0137068 A1 May 19, 2016

(30) Foreign Application Priority Data

Nov. 14, 2014 (JP) ................................ 2014-231881

(51) Int. Cl.
*G06F 7/70* (2006.01)
*G06F 19/00* (2011.01)
(Continued)

(52) U.S. Cl.
CPC ........ *B60L 7/26* (2013.01); *B60T 1/10* (2013.01); *B60T 7/042* (2013.01); *B60T 8/172* (2013.01);
(Continued)

(58) Field of Classification Search
CPC .......... B60L 7/26; B60T 1/10; B60T 2220/04; B60T 2270/604; B60T 7/042; B60T 8/172
(Continued)

(56) References Cited

U.S. PATENT DOCUMENTS 5,322,352 A * 6/1994 Ohno ..................... B60L 7/26
188/156
6,120,115 A 9/2000 Manabe
(Continued)

FOREIGN PATENT DOCUMENTS

DE 10 2010 041 997 A1 4/2012
DE 10 2012 021 057 A1 4/2014
(Continued)

*Primary Examiner* — Harry Oh
(74) *Attorney, Agent, or Firm* — Finnegan, Henderson, Farabow, Garrett & Dunner, LLP

(57) ABSTRACT

A braking force (BF) control system includes: a first required BF calculator that calculates, based on a position of the brake pedal, a first required friction BF allocated to the friction brake and a first required regenerative BF allocated to regenerative control of the drive motor; a second required BF calculator that calculates, based on a position of the acceleration pedal, a second required friction BF allocated to the friction brake and a second required regenerative BF allocated to the regenerative control; a regenerative total BF calculation/execution portion that calculates a regenerative total BF based on the first and second required regenerative BFs and performs the regenerative control based on the regenerative total BF; and a friction total BF calculation/execution portion that calculates a friction total BF based on the first and second required friction BFs and controls the friction brake based on the friction total BF.

6 Claims, 2 Drawing Sheets

(51) Int. Cl.
  *G06G 7/00*   (2006.01)
  *G06G 7/76*   (2006.01)
  *B60L 7/26*   (2006.01)
  *B60T 7/04*   (2006.01)
  *B60T 8/172*  (2006.01)
  *B60T 1/10*   (2006.01)

(52) U.S. Cl.
  CPC ..... *B60T 2220/04* (2013.01); *B60T 2270/604* (2013.01)

(58) Field of Classification Search
  USPC .......................................................... 701/70
  See application file for complete search history.

(56) References Cited

U.S. PATENT DOCUMENTS

| | | | | |
|---|---|---|---|---|
| 8,634,939 B2* | 1/2014 | Martin | ................ | B60W 20/00 180/165 |
| 8,712,616 B2* | 4/2014 | Treharne | ................. | B60L 1/003 180/65.265 |
| 8,744,712 B2* | 6/2014 | Tashiro | .................... | B60L 7/18 303/152 |
| 2002/0017405 A1 | 2/2002 | Nada | | |
| 2012/0139329 A1* | 6/2012 | Fabini | ...................... | B60L 7/10 303/3 |
| 2016/0264111 A1* | 9/2016 | Doi | ....................... | B60T 8/1766 |

FOREIGN PATENT DOCUMENTS

| | | |
|---|---|---|
| JP | H08-140203 A | 5/1996 |
| JP | 11-275708 | 10/1999 |
| JP | 2000-217201 A | 8/2000 |
| JP | 2001-320801 A | 11/2001 |
| JP | 2011-234540 A | 11/2011 |
| JP | 2013-99081 | 5/2013 |
| KR | 10-1999-0050663 | 7/1999 |

\* cited by examiner

BRAKING FORCE CONTROL SYSTEM, VEHICLE AND METHOD OF CONTROLLING BRAKING FORCE

CROSS-REFERENCE TO RELATED APPLICATIONS

The present application claims priority based on Japanese Patent Application No. 2014-231881 filed on Nov. 14, 2014 the entire disclosure of which is hereby incorporated by reference.

BACKGROUND OF THE INVENTION

The present invention relates to a braking force control system, a vehicle and a method of controlling a braking force.

Conventionally, in a fuel cell vehicle in which a travel motor is driven by power generated by a fuel cell, as disclosed in JP2013-99081A, the travel motor is operated as a generator when the vehicle is decelerated or travels down a slope to generate power and perform regenerative braking for obtaining a brake force, and regenerative power generated by regenerative braking is charged in a secondary cell. Surplus power which cannot be charged in the secondary cell is consumed by an auxiliary machine, and then power which cannot be consumed in this way is consumed by a mechanical brake (friction brake which will be described later).

However, in the conventional technology disclosed in JP2013-99081A, only a braking force corresponding to the stepping back of an accelerator pedal in a travel process is controlled, and measures are not sufficiently taken on coordination between the control on the braking force corresponding to the stepping back of the accelerator pedal and control on a braking force corresponding to the position of a brake pedal. Such a problem is present not only in a fuel cell vehicle but also a vehicle such as an electric automobile that travels with a motor.

The present invention is made so as to solve at least part of the problem described above, and can be realized in aspects below.

SUMMARY OF THE INVENTION (1) According to one aspect of the present invention, there is provided a vehicle-mounted braking force control system that includes a drive motor which drives a wheel, a friction brake which brakes the wheel, a brake pedal and an acceleration pedal. The braking force control system may include a first required braking force calculator that calculates, based on a brake position of the brake pedal, each of a first required friction braking force allocated to the friction brake and a first required regenerative braking force allocated to regenerative control of the drive motor; a second required braking force calculator that calculates, based on an acceleration position of the acceleration pedal, each of a second required friction braking force allocated to the friction brake and a second required regenerative braking force allocated to the regenerative control; a regenerative total braking force calculation/execution portion that calculates a regenerative total braking force based on the first required regenerative braking force and the second required regenerative braking force and that performs the regenerative control based on the regenerative total braking force; and a friction total braking force calculation/execution portion that calculates a friction total braking force based on the first required friction braking force and the second required friction braking force and that controls the friction brake based on the friction total braking force. In the braking force control system of this configuration, the requirement braking force on the hydraulic pressure and the requirement braking force on the regeneration are calculated from the brake position and the acceleration position, and they are calculated so as to be associated with each other, with the result that it is possible to perform control based on the optimum hydraulic total braking force and the regenerative total braking force. Hence, it is possible to perform braking force control in which the acceleration pedal and the brake pedal are coordinated, and thus the controllability thereof is excellent.

(2) In the braking force control system of the above aspect, the friction total braking force calculation/execution portion may update the first required friction braking force calculated based on the brake position of the brake pedal using a first execution regenerative braking force determined based on the first required regenerative braking force, and calculates the friction total braking force using the updated first required friction braking force. With this braking force control system, it is possible to easily perform control with priority given to the regenerative brake.

(3) According to another aspect of the present invention, there is provided a braking force control method for a vehicle that includes a drive motor which drives a wheel, a friction brake which brakes the wheel, a brake pedal and an acceleration pedal. The braking force control method may include: a step of calculating, based on a brake position of the brake pedal, each of a first required friction braking force allocated to the friction brake and a first required regenerative braking force allocated to regenerative control of the drive motor; a step of calculating, based on an acceleration position of the acceleration pedal, each of a second required friction braking force allocated to the friction brake and a second required regenerative braking force allocated to the regenerative control; a step of calculating a regenerative total braking force based on the first required regenerative braking force and the second required regenerative braking force and performing the regenerative control based on the regenerative total braking force. In the braking force control method of this configuration, as in the braking force control system of the above aspect, it is possible to perform braking force control in which the acceleration pedal and the brake pedal are coordinated, and thus the controllability thereof is excellent.

The present invention can also be realized in various aspects other than the braking force control system and the braking force control method. It is possible to realize the present invention in aspects such as computer programs for realizing the functions corresponding to the vehicle including the braking force control system and the steps of the braking force control method and a recording medium in which the computer programs are recorded.

An embodiment of the present invention will then be described.

DETAILED DESCRIPTION OF EMBODIMENT

A. Overall Configuration

Figure 1:
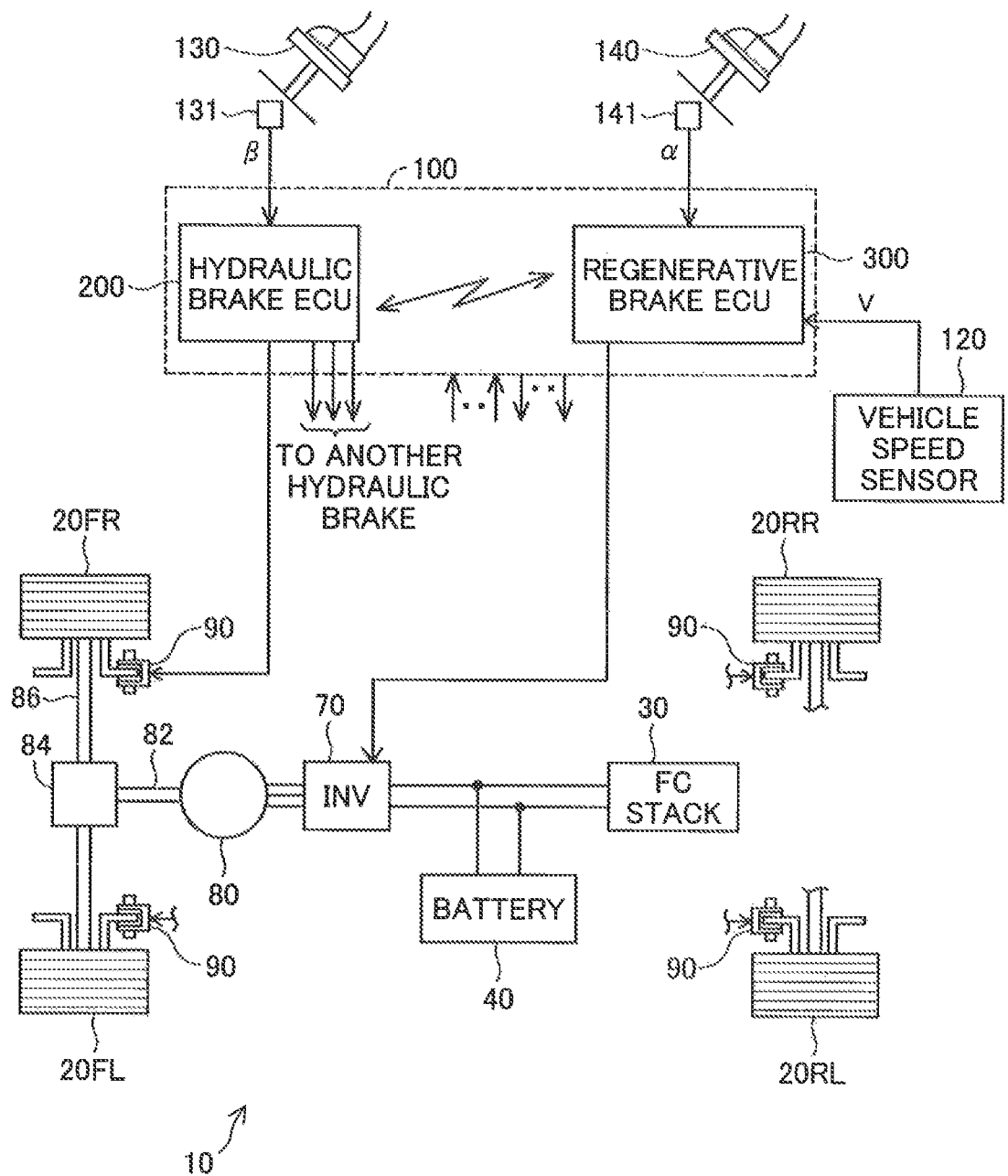
FIG. 1 is an illustrative diagram showing a schematic configuration of a vehicle according to an embodiment of the present invention.

FIG. 1 is an illustrative diagram showing a schematic configuration of a vehicle 10 according to an embodiment of the present invention. The vehicle 10 is a four-wheeled vehicle including left and right front wheels 20FL and 20FR and left and right rear wheels 20RL and 20RR, and includes a fuel cell stack 30, a battery 40 serving as a secondary cell, an inverter 70, a drive motor 80 and a control device 100.

The vehicle 10 is a so-called FF vehicle in which the drive force of the drive motor 80 is transmitted through a drive shaft 82, an differential gear 84 and an axle 86 to the front wheels 20FL and 20FR serving as drive wheels. It is noted that instead of an FF vehicle, the vehicle 10 may be an FR vehicle in which the drive force of the drive motor 80 is transmitted to the rear wheels 20RL and 20RR or may be a 4WD vehicle in which the drive force of the drive motor 80 is transmitted both to the front wheels 20FL and 20FR and the rear wheels 20RL and 20RR.

In each of the front wheels 20FL and 20FR and the rear wheels 20RL and 20RR, a hydraulic brake 90 is provided. The hydraulic brake 90 is a hydraulic-driven disk brake. The hydraulic brake 90 is driven by the control device 100 to obtain a braking force (brake force) of the vehicle 10. The hydraulic brake 90 corresponds to a "friction brake" in one aspect of the present invention.

The fuel cell stack 30 is a unit that generates power by an electrochemical reaction between hydrogen and oxygen, and is formed by stacking a plurality of unit cells in layers. The unit cell is formed with an anode, a cathode, an electrolyte, a separator and the like. Although various types can be applied to the fuel cell stack 30, in the present embodiment, a solid polymer type is assumed to be used.

The drive motor 80 is connected to the output of the fuel cell stack 30 through the inverter 70. The battery 40 is also connected to the output of the fuel cell stack 30. For example, when high power is required at the time of the start or acceleration of the vehicle 10, it is possible to cope with such a requirement by acquiring power not only from the fuel cell stack 30 but also from the battery 40 to supply it to the drive motor 80. The battery 40 is, for example, a nickel-metal hydride battery or a lithium-ion battery. The battery 40 is connected through an unillustrated DC/DC converter to the output of the fuel cell stack 30.

The inverter 70 converts a DC current supplied from the fuel cell stack 30 or the battery 40 into an AC current, and supplies it to the drive motor 80 to drive the drive motor 80. When the vehicle 10 is decelerated or travels down a slope, the drive motor 80 is operated as a generator to generate power and regenerative braking for obtaining a braking force is performed. The regenerative braking corresponds to an engine brake in a vehicle having an engine, and in the following description, "EB" indicates a braking force corresponding to an engine brake. The regenerative braking corresponds to a "regenerative brake" in one aspect of the present invention.

Regenerative power generated by the regenerative braking can be stored in the battery 40 through the inverter 70. In the present embodiment, a difference obtained by subtracting power which can charge the battery 40 from the regenerative power of the drive motor 80 is surplus power, and the surplus power is consumed by an unillustrated auxiliary machine.

The control device 100 controls valves, pumps and the like included in a flow path supply/discharge system attached to the fuel cell stack 30 to control the operation (such as the amount of power generated) of the fuel cell stack 30. The control device 100 controls the inverter 70 to control the drive force of the vehicle 10. Furthermore, the control device 100 controls the hydraulic brake 90 and the inverter 70 to control the braking force of the vehicle 10. In order to perform these types of control, various signals are input to the control device 100. These signals include, for example, output signals from a vehicle speed sensor 120 that detects the speed (vehicle speed) V of the vehicle 10, a brake position sensor 131 that detects the amount of operation (hereinafter referred to as a "brake position") β of a brake pedal 130 and an acceleration position sensor 141 that detects the amount of operation (hereinafter referred to as an "acceleration position") a of an acceleration pedal 140. The brake pedal 130 and the acceleration pedal 140 are operated by a driver.

Specifically, the control device 100 includes a hydraulic brake ECU 200 and a regenerative brake ECU 300. Each of the ECUs 200 and 300 is a microcomputer that includes a CPU, a RAM and a ROM therewithin, and they can communicate in both directions.

The hydraulic brake ECU 200 acquires the brake position β from the brake position sensor 131. The hydraulic brake ECU 200 calculates, based on the acquired brake position β and predetermined information obtained from the regenerative brake ECU 300, a total braking force (hereinafter referred to as a "hydraulic total braking force") allocated to the hydraulic brake. The hydraulic brake ECU 200 controls the hydraulic brake 90 based on the hydraulic total braking force to control the braking force of the vehicle 10 produced by the hydraulic brake 90.

The regenerative brake ECU 300 acquires the acceleration position α from the acceleration position sensor 141, and acquires the vehicle speed V from the vehicle speed sensor 120. The regenerative brake ECU 300 calculates, based on the acceleration position α and the vehicle speed V which are acquired and the predetermined information obtained from the hydraulic brake ECU 200, a total braking force (hereinafter referred to as a "regenerative total braking force") allocated to the regenerative brake. The regenerative brake ECU 300 controls the inverter 70 based on the regenerative total braking force to control the braking force of the vehicle 10 produced by regenerative control. The hydraulic brake ECU 200 and the regenerative brake ECU 300 are operated when the vehicle 10 travels.

B. Configuration of Brake ECUs

Figure 2:
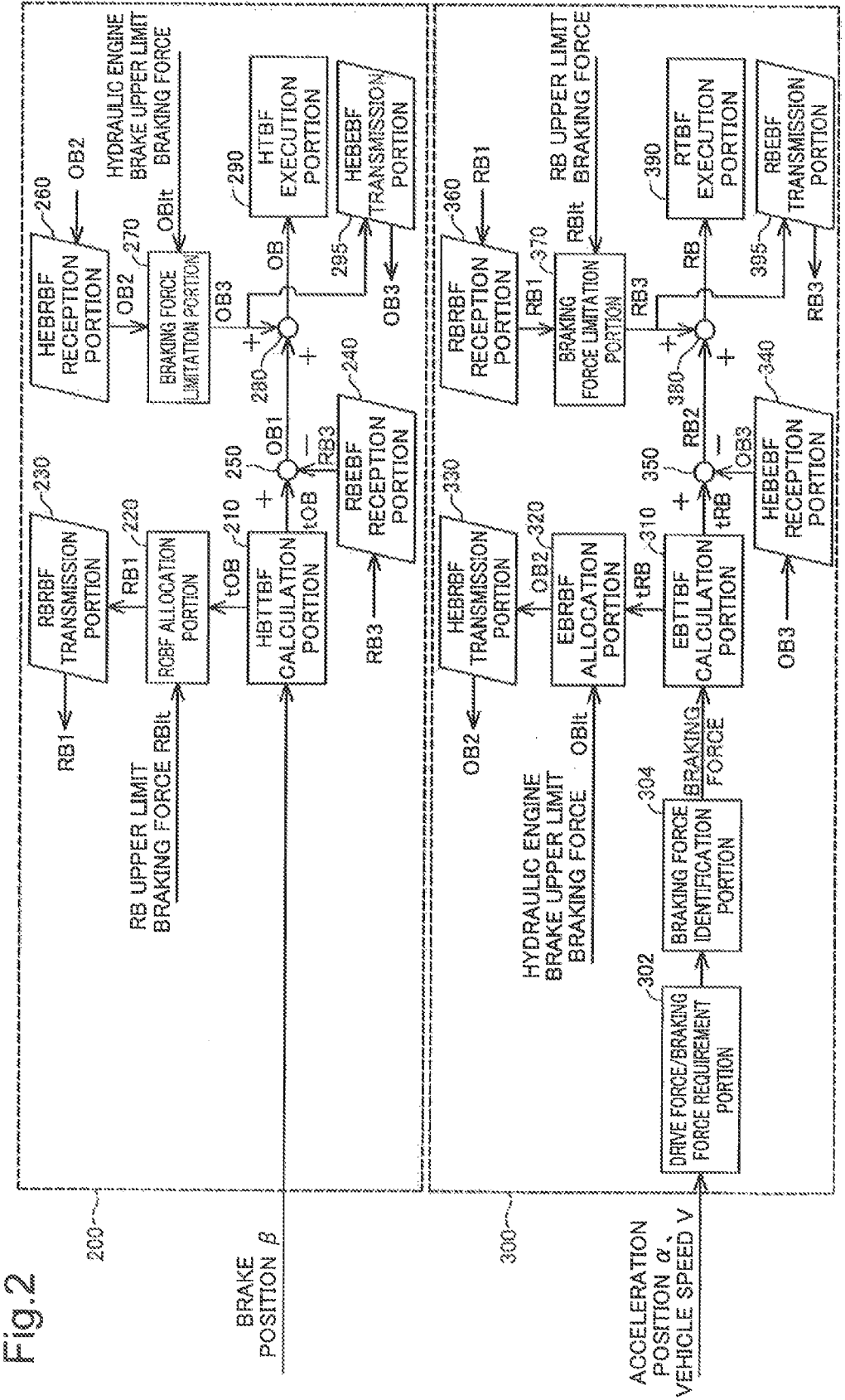
FIG. 2 is a control block diagram for illustrating a hydraulic brake ECU and a regenerative brake ECU.

FIG. 2 is a control block diagram for illustrating the hydraulic brake ECU 200 and the regenerative brake ECU 300. The constituent elements shown in the figure indicate functions realized by the ECUs 200 and 300. In the ECUs 200 and 300, predetermined programs stored in the ROM are executed by the CPU to realize the functions.

The hydraulic brake ECU 200 will first be described. The hydraulic brake ECU 200 includes, as functional constituent elements, a hydraulic brake target total braking force calculation portion 210 (hereinafter referred to as a "HB-TTBF calculation portion 210"), a regenerative coordination braking force allocation portion 220 (hereinafter referred to as a "RCBF allocation portion 220"), a regenerative brake required braking force transmission portion 230 (hereinafter referred to as a "RB-RBF transmission portion 230"), a regenerative brake execution braking force reception portion 240 (hereinafter referred to as a "RB-EBF reception portion 240"), a subtraction portion 250, a hydraulic engine brake required braking force reception portion 260 (hereinafter referred to as a "HEB-RBF reception portion 260"), a braking force limitation portion 270, an addition portion 280, a hydraulic total braking force execution portion 290 (hereinafter referred to as a "HTBF execution portion 290") and a hydraulic engine brake execution braking force transmission portion 295 (hereinafter referred to as a "HEB-EBF transmission portion 295").

The HB-TTBF calculation portion 210 calculates, based on the brake position β acquired from the brake position sensor 131, a target braking force allocated to the hydraulic brake 90. The calculated braking force is referred to as a hydraulic brake target total braking force tOB (hereinafter referred to as a "HB target total braking force tOB").

The RCBF allocation portion 220 allocates the HB target total braking force tOB determined by the HB-TTBF calculation portion 210 to a hydraulic brake required braking force and a regenerative brake required braking force. In the present specification, the "regenerative coordination" means that the hydraulic brake and the regenerative brake are added. Specifically, the RCBF allocation portion 220 allocates the HB target total braking force tOB to the hydraulic brake required braking force and the regenerative brake required braking force. As the allocation method, for example, the following method can be adopted. Specifically, a regenerative brake upper limit braking force RBlt (hereinafter referred to as a "RB upper limit braking force RBlt") is received from another unillustrated ECU. When the HB target total braking force tOB is equal to or less than the RB upper limit braking force RBlt, the regenerative brake required braking force compensates for the HB target total braking force tOB. When the HB target total braking force tOB exceeds the RB upper limit braking force RBlt, a difference obtained when the HB target total braking force tOB exceeds the RB upper limit braking force RBlt is assumed to be the hydraulic brake required braking force. The RB upper limit braking force RBlt is a value that is determined based on the state of the battery 40 such as the SOC (State Of Charge) and the temperature of the drive motor 80, and is transmitted from another ECU. For example, when the SOC is high or when the temperature of the drive motor 80 is low, the RB upper limit braking force RBlt is a high value.

Although the allocation method described above is the preferential allocation to the regenerative brake required braking force, the allocation method is not limited to the method described above. The allocation method can be changed to various methods such as a method of first setting the allocation of the regenerative brake required braking force at zero or a small amount and gradually increasing the proportion of the regenerative brake required braking force as the HB target total braking force tOB is increased.

The regenerative brake required braking force RB1 (hereinafter referred to as a "RB required braking force") determined by the RCBF allocation portion 220 is transmitted by the RB-RBF transmission portion 230 to the regenerative brake ECU 300, which is the ECU on the other side. The RB required braking force RB1 corresponds to a subordinate concept of a "first required regenerative braking force" in one aspect of the present invention. It is noted that in the present embodiment, the hydraulic brake required braking force determined by the RCBF allocation portion 220 is not particularly used.

The RB-EBF reception portion 240 performs processing for receiving a regenerative brake execution braking force RB3 (hereinafter referred to as an "RB execution braking force RB3") transmitted from a regenerative brake execution braking force transmission portion 395 which will be described later included in the regenerative brake ECU 300. The RB execution braking force RB3 is a braking force that is caused by a regenerative brake executed on the side of the regenerative brake ECU 300 immediately before. The RB execution braking force RB3 corresponds to a subordinate concept of a "first execution regenerative braking force" in one aspect of the present invention.

The HB target total braking force tOB determined by the HB-TTBF calculation portion 210 is also transmitted to the subtraction portion 250. The subtraction portion 250 updates the HB target total braking force tOB by subtracting, from the HB target total braking force tOB, the RB execution braking force RB3 received by the RB-EBF reception portion 240. The updated HB target total braking force tOB corresponds to a hydraulic brake required braking force OB1 (hereinafter referred to as a "HB required braking force OB1") determined based on the brake position β. The HB target total braking force tOB corresponds to a subordinate concept of a "first required friction braking force" in one aspect of the present invention.

The HEB-RBF reception portion 260 performs processing for receiving a hydraulic engine brake required braking force OB2 (hereinafter referred to as a "HEB required braking force OB2") transmitted from a hydraulic engine brake required braking force transmission portion 330 included in the regenerative brake ECU 300. The HEB required braking force OB2 is a braking force that is required on the side of the regenerative brake ECU 300 as a hydraulic engine brake immediately before.

The braking force limitation portion 270 limits the HEB required braking force OB2 received by the HEB-RBF reception portion 260 with a hydraulic engine brake upper limit braking force OB1$t$ (hereinafter referred to as a "HEB upper limit braking force OB1$t$") received from another unillustrated ECU. Specifically, when the HEB required braking force OB2 exceeds the HEB upper limit braking force OB1$t$, the HEB required braking force OB2 is made equal in magnitude to the HEB upper limit braking force OB1$t$. The hydraulic engine brake required braking force after this limitation is referred to as a hydraulic engine brake execution braking force OB3 (hereinafter referred to as a "HEB execution braking force OB3"). The HEB upper limit braking force OB1$t$ is also used in an engine brake required braking force allocation portion 320 included in the regenerative brake ECU 300, and the HEB upper limit braking force OB1$t$ will be described later.

The addition portion 280 adds together the HB required braking force OB1 transmitted from the side of the subtraction portion 250 and the HEB execution braking force OB3 transmitted from the side of the braking force limitation portion 270, and thereby determines a hydraulic total braking force OB.

The HTBF execution portion 290 controls the hydraulic brake 90 based on the hydraulic total braking force OB determined by the addition portion 280 to control the braking force of the vehicle 10 produced by the hydraulic brake 90.

The HEB required braking force OB2 output from the braking force limitation portion 270 is also transmitted to the HEB-EBF transmission portion 295, and is transmitted by the HEB-EBF transmission portion 295 to the regenerative brake ECU 300.

The regenerative brake ECU 300 will then be described. The configuration of the regenerative brake ECU 300 is a configuration that is mirrored by the configuration of the hydraulic brake ECU 200. It is noted that, in the regenerative brake ECU 300, the "regenerative brake" in the configuration of the hydraulic brake ECU 200 can be replaced with the "hydraulic engine brake", and the "hydraulic engine brake" therein can be replaced with the "regenerative brake". Specifically, the regenerative brake ECU 300 includes, as functional constituent elements, a drive force/braking force requirement portion 302 (hereinafter referred to as a "DF/BF requirement portion 302"), a braking force identification portion 304, an engine brake target total braking force calculation portion 310 (hereinafter referred to as an "EB-TTBF calculation portion 310"), an engine brake required braking force allocation portion 320 (hereinafter referred to as an "EB-RBF allocation portion 320"), a hydraulic engine brake required braking force transmission portion 330 (hereinafter referred to as a "HEB-RBF transmission portion 330"), a hydraulic engine brake execution braking force reception portion 340 (hereinafter referred to as a "HEB-EBF reception portion 340"), a subtraction portion 350, a regenerative brake required braking force reception portion 360 (hereinafter referred to as a "RB-RBF reception portion 360"), a braking force limitation portion 370, an addition portion 380, a regenerative total braking force execution portion 390 (hereinafter referred to as a "RTBF execution portion 390") and a regenerative brake execution braking force transmission portion 395 (hereinafter referred to as a "RB-EBF transmission portion 395").

The DF/BF requirement portion 302 calculates, based on the acceleration position α acquired from the acceleration position sensor 141 and the vehicle speed V acquired from the vehicle speed sensor 120, a drive force and a braking force required for the vehicle 10. Then, the braking force identification portion 304 identifies the braking force from the output of the DF/BF requirement portion 302, and outputs the value of the identified braking force.

The EB-TTBF calculation portion 310 calculates, based on the braking force input from the DF/BF requirement portion 302, a target braking force allocated to the regenerative brake. The braking force calculated here is referred to as an engine brake target total braking force tRB (an EB target total braking force tRB). Here, in order to distinguish the "regenerative brake" on the side of the hydraulic brake ECU 200, the calculated braking force is referred to as the engine brake target total braking force tRB by using the "engine brake".

The EB-RBF allocation portion 320 allocates the EB target total braking force tRB determined by the EB-TTBF calculation portion 310 to the regenerative brake requirement braking force and the hydraulic engine brake required braking force. As the allocation method, for example, the following method can be adopted. Specifically, the EB target total braking force tRB is received from another unillustrated ECU. When the EB target total braking force tRB is equal to or less than the HEB upper limit braking force OB1t, the regenerative brake required braking force compensates for the EB target total braking force tRB by 100%. When the EB target total braking force tRB exceeds the HEB upper limit braking force OB1t, a difference obtained when the EB target total braking force tRB exceeds the HEB upper limit braking force OB1t is assumed to be the hydraulic engine brake required braking force. The HEB upper limit braking force OB1t is a value that is determined based on the temperature of a brake rotor included in the hydraulic brake 90, and is transmitted from another ECU. When the temperature of the brake rotor is high, since an available force serving as the hydraulic brake is low, the HEB upper limit braking force OB1t is set to be a small value.

Although the allocation method described above is the preferential allocation to the regenerative brake required braking force, the allocation method is not limited to the method described above. The allocation method can be changed to various methods such as a method of first setting the allocation of the hydraulic engine brake required braking force at zero or a small amount and gradually increasing the proportion of the hydraulic engine brake required braking force as the EB target total braking force tRB is increased.

The HEB required braking force OB2 determined by the EB-RBF allocation portion 320 is transmitted by the HEB-RBF transmission portion 330 to the hydraulic brake ECU 200, which is the ECU on the other side. The HEB required braking force OB2 corresponds to a subordinate concept of a "second required friction braking force" in one aspect of the present invention.

The HEB-EBF reception portion 340 performs processing for receiving the HEB execution braking force OB3 transmitted from the HEB-EBF transmission portion 295 of the hydraulic brake ECU 200. The HEB execution braking force OB3 is a braking force that is caused by the hydraulic brake executed on the side of the hydraulic brake ECU 200 immediately before.

The EB target total braking force tRB determined by the EB-TTBF calculation portion 310 is also transmitted to the subtraction portion 350. The subtraction portion 350 updates the EB target total braking force tRB by subtracting, from the EB target total braking force tRB, the HEB execution braking force OB3 received by the HEB-EBF reception portion 340. The updated EB target total braking force tRB corresponds to a regenerative engine brake required braking force RB2 (hereinafter referred to as a "REB required braking force RB2") determined based on the acceleration position α and the vehicle speed V. The EB target total braking force tRB corresponds to a subordinate concept of a "second required regenerative braking force" in one aspect of the present invention.

The RB-RBF reception portion 360 performs processing for receiving the RB required braking force RB1 transmitted from the RB-RBF transmission portion 230 of the hydraulic brake ECU 200. The RB required braking force RB1 is a braking force that is required as a regenerative brake on the side of the hydraulic brake ECU 200 immediately before.

The braking force limitation portion 370 limits the RB required braking force RB1 received by the RB-RBF reception portion 360 with the RB upper limit braking force RBlt received from another unillustrated ECU. Specifically, when the RB required braking force RB1 exceeds the RB upper limit braking force RBlt, the RB required braking force RB1 is made equal in magnitude to the RB upper limit braking force RBlt. The regenerative brake required braking force after this limitation is referred to as the regenerative brake execution braking force RB3 (hereinafter referred to as an "RB execution braking force RB3"). The RB upper limit braking force RBlt is the same as the regenerative brake upper limit braking force used in the RCBF allocation portion 220 of the regenerative brake ECU 300.

The addition portion 380 adds together the REB required braking force RB2 transmitted from the side of the subtraction portion 350 and the RB execution braking force RB3 transmitted from the side of the braking force limitation portion 370, and thereby determines the regenerative total braking force RB.

The RTBF execution portion 390 controls the inverter 70 based on the regenerative total braking force RB determined by the addition portion 380 to control the braking force of the vehicle 10 produced by regenerative control.

The RB execution braking force RB3 output from the braking force limitation portion 370 is also transmitted to the RB-EBF transmission portion 395, and is transmitted by the RB-EBF transmission portion 395 to the hydraulic brake ECU 200.

C. Effects of the Embodiment

In the vehicle 10 of the first embodiment configured as described above, the HB required braking force OB1 and the RB required braking force RB1 are calculated based on the brake position β, the HEB required braking force OB2 and the REB required braking force RB2 are calculated based on the acceleration position α and they are calculated so as to be associated with each other, with the result that it is possible to perform control based on the optimum hydraulic total braking force OB and the regenerative total braking force RB. Hence, it is possible to perform braking force control in which the acceleration pedal 140 and the brake pedal 130 are coordinated, and thus the controllability thereof is excellent.

The vehicle 10 can cope with various driving operations including a case where the acceleration pedal 140 and the brake pedal 130 are operated with left and right feet. For example, in a case where the acceleration pedal 140 is stepped back in a state where the brake pedal 130 is stepped on only by a given amount, it is possible to set the system such that (i) for a regenerative requirement based on the acceleration position α, the system performs braking with priority given to the regenerative brake, and (ii) for a hydraulic requirement based on the brake position R, the system continues a constant state of the hydraulic brake. For example, in a case where the brake pedal 130 is stepped on in a state where the acceleration pedal 140 is released, by the hydraulic requirement based on the brake position 3, it is possible to set the system such that braking is performed with priority given to the regenerative brake. Hence, the controllability on the braking control is excellent.

The control device 100 of the present embodiment corresponds to a "braking force control system" in one aspect of the present invention. The HB-TTBF calculation portion 210 and the RCBF allocation portion 220 correspond to a "first required braking force calculator". The EB-TTBF calculation portion 310 and the EB-RBF allocation portion 320 correspond to a "second required braking force calculator". The subtraction portion 350, the braking force limitation portion 370, the addition portion 380 and the RTBF execution portion 390 correspond to a "regenerative total braking force calculation/execution portion".

D. Variations

Variation 1:
Although in the embodiment described above, as the friction brake of the vehicle, the hydraulic-driven brake is used, the friction brake is not limited to the hydraulic-driven type, and can be replaced with various driven type motors such as pneumatic-driven, motor-driven and electromagnetic-driven type motors. As the mechanism of the friction brake, for example, an aspect such as a drum brake other than a disk brake can also be adopted.

Variation 2:
Although in the embodiment described above, the input of the regenerative brake ECU 300 is both the acceleration position α and the vehicle speed V, instead of this aspect, an aspect may be adopted in which the vehicle speed V is not input to the regenerative brake ECU 300 but the acceleration position α is input to the regenerative brake ECU 300.

Variation 3:
In the embodiment described above, the hydraulic brake ECU 200 and the regenerative brake ECU 300 are constantly operated when the vehicle travels. However, when a specific operation switch or operation lever operated by the driver is turned on, at least one of the hydraulic brake ECU 200 and the regenerative brake ECU 300 may be operated.

Variation 4:
In the embodiment described above, the braking force control on the hydraulic brake and the braking force control on the regenerative brake are performed by separate computers. However, instead of this configuration, a configuration may be adopted in which the braking force control on both brakes may be performed by one computer. In other words, as long as the braking force control is individually performed, such control may be realized with one computer or a plurality of computers.

Variation 5:
Although the embodiment described above is applied to the vehicle mounting a fuel cell, the vehicle does not necessarily need to mount a fuel cell. As long as the vehicle is driven with a drive motor, the embodiment can be applied to other types of vehicles such as an electric automobile.

In the embodiment described above, the control device 100 serving as the braking force control system is mounted on the vehicle 10. The braking force control system can be applied to various devices (including, for example, a self-propelled robot) that accelerate and decelerate.

In the embodiment described above, the HB target total braking force tOB is updated, and based on the updated HB target total braking force tOB (the HB required braking force OB1), the hydraulic total braking force OB is determined. However, the HB target total braking force tOB can be used for the calculation of the hydraulic total braking force OB without being updated.

Part of the functions realized by software in the embodiment and variations described above may be realized by hardware (for example, an integrated circuit) or part of the functions realized by hardware may be realized by software.

The present invention is not limited to the embodiment and variations described above, and can be realized in various configurations without departing from the spirit thereof. For example, the technical features of the embodiment and variations corresponding to the technical features in the aspects described in the section of Summary of the Invention can be replaced or combined as necessary so that part or the whole of the problem describe previously is solved or part or the whole of the effects described previously is achieved. Elements other than elements described in independent claims among the constituent elements of the embodiment and variations described above are additional elements, and can be omitted as necessary.

What is claimed is:

1. A braking force control system for controlling a drive motor which drives a wheel and a friction brake which brakes the wheel based on input from a brake pedal and an acceleration pedal, comprising:
   a non-transitory computer-readable storage medium storing instructions; and
   one or more processors that execute the instructions to:
      calculate, based on a depression of the brake pedal, a first required friction braking force associated with the friction brake and a first required regenerative braking force associated with a regenerative control of the drive motor;

calculate, based on a depression of the acceleration pedal, a second required friction braking force associated with the friction brake and a second required regenerative braking force associated with the regenerative control of the drive motor;

calculate a regenerative total braking force based on the first required regenerative braking force and the second required regenerative braking force;

perform the regenerative control based on the regenerative total braking force;

calculate a friction total braking force based on the first required friction braking force and the second required friction braking force; and cause an actuation of the friction brake based on the friction total braking force.

2. The braking force control system according to claim 1, the instructions further causing the one or more processors to:

update the first required friction braking force calculated based on the depression of the brake pedal using a first execution regenerative braking force determined based on the first required regenerative braking force; and calculate the friction total braking force using the updated first required friction braking force.

3. A vehicle, comprising:
a drive motor configured to drive a wheel;
a friction brake configured to brake the wheel;
a brake pedal;
an acceleration pedal;
a non-transitory computer-readable storage medium storing instructions; and
one or more processors that execute the instructions to:
calculate, based on a depression of the brake pedal, a first required friction braking force associated with the friction brake and a first required regenerative braking force associated with a regenerative control of the drive motor;

calculate, based on a depression of the acceleration pedal, a second required friction braking force associated with the friction brake and a second required regenerative braking force associated with the regenerative control;

calculate a regenerative total braking force based on the first required regenerative braking force and the second required regenerative braking force;

perform the regenerative control based on the regenerative total braking force;

calculate a friction total braking force based on the first required friction braking force and the second required friction braking force; and cause an actuation of the friction brake based on the friction total braking force.

4. The vehicle according to claim 3, further comprising:
a fuel cell that supplies power to the drive motor.

5. A braking force control method for a vehicle that includes a drive motor which drives a wheel, a friction brake which brakes the wheel, a brake pedal and an acceleration pedal, the braking force control method comprising:

calculating, based on a depression of the brake pedal, a first required friction braking force associated with the friction brake and a first required regenerative braking force associated with a regenerative control of the drive motor;

calculating, based on a depression of the acceleration pedal, a second required friction braking force associated with the friction brake and a second required regenerative braking force associated with the regenerative control;

calculating a regenerative total braking force based on the first required regenerative braking force and the second required regenerative braking force;

performing the regenerative control based on the regenerative total braking force;

calculating a friction total braking force based on the first required friction braking force and the second required friction braking force; and causing an actuation of the friction brake based on the friction total braking force.

6. The braking force control method according to claim 5, wherein the control of the friction brake based on the friction total braking force includes:

updating the first required friction braking force calculated based on the depression of the brake pedal based on a first execution regenerative braking force determined using the first required regenerative braking force; and calculating the friction total braking force using the updated first required friction braking force.

* * * * *